(12) United States Patent
Kale et al.

(10) Patent No.: US 10,133,958 B2
(45) Date of Patent: Nov. 20, 2018

(54) DETERMINING AN ITEM THAT HAS CONFIRMED CHARACTERISTICS

(71) Applicant: eBay Inc., San Jose, CA (US)

(72) Inventors: Ajinkya Gorakhnath Kale, San Jose, CA (US); Mohammadhadi Kiapour, San Francisco, CA (US); Robinson Piramuthu, Oakland, CA (US); Fan Yang, San Jose, CA (US); Qiaosong Wang, San Francisco, CA (US)

(73) Assignee: eBay Inc., San Jose, CA (US)

( * ) Notice: Subject to any disclaimer, the term of this patent is extended or adjusted under 35 U.S.C. 154(b) by 18 days.

(21) Appl. No.: 15/270,844

(22) Filed: Sep. 20, 2016

(65) Prior Publication Data
US 2018/0053069 A1 Feb. 22, 2018

Related U.S. Application Data

(60) Provisional application No. 62/375,855, filed on Aug. 16, 2016.

(51) Int. Cl.
*G06K 9/62* (2006.01)
*G06F 17/30* (2006.01)
(Continued)

(52) U.S. Cl.
CPC ..... *G06K 9/6201* (2013.01); *G06F 17/30265* (2013.01); *G06K 9/52* (2013.01);
(Continued)

(58) Field of Classification Search
CPC .......... G06K 9/6201; G06K 9/52; G06K 9/66; G06T 11/206; G06T 2207/20076; G06Q 30/0643; G06F 17/30265; G06F 3/0482
See application file for complete search history.

(56) References Cited

U.S. PATENT DOCUMENTS 7,731,091 B2 * 6/2010 Knowles ................. A47F 9/046
235/462.01
7,864,178 B2 * 1/2011 Marini ..................... G06F 8/34
345/440
(Continued)

FOREIGN PATENT DOCUMENTS

WO 2018/034895 A1 2/2018

OTHER PUBLICATIONS

International Search Report received for PCT Application No. PCT/US2017/045948, dated Oct. 25, 2017, 2 pages.
(Continued)

*Primary Examiner* — John Strege
(74) *Attorney, Agent, or Firm* — Schwegman Lundberg & Woessner, P.A.

(57) ABSTRACT

In various example embodiments, a system and method for determining an item that has confirmed characteristics are described herein. An image that depicts an object is received from a client device. Structured data that corresponds to characteristics of one or more items are retrieved. A set of characteristics is determined, the set of characteristics being predicted to match with the object. An interface that includes a request for confirmation of the set of characteristics is generated. The interface is displayed on the client device. Confirmation that at least one characteristic from the set of characteristics matches with the object depicted in the image is received from the client device.

16 Claims, 11 Drawing Sheets

(51) Int. Cl.
*G06K 9/52* (2006.01)
*G06K 9/66* (2006.01)
*G06N 7/00* (2006.01)
*G06Q 30/06* (2012.01)
*G06T 11/20* (2006.01)
*G06F 3/0482* (2013.01)

(52) U.S. Cl.
CPC ............... *G06K 9/66* (2013.01); *G06N 7/005* (2013.01); *G06Q 30/0643* (2013.01); *G06T 11/206* (2013.01); *G06F 3/0482* (2013.01); *G06T 2207/20076* (2013.01)

(56) References Cited

U.S. PATENT DOCUMENTS 8,028,246 B2 * 9/2011 McIntyre .............. G06F 3/0482
  382/325
2007/0168943 A1 * 7/2007 Marini .................... G06F 8/34
  717/108
2008/0059281 A1 * 3/2008 Tower .................... G06Q 30/02
  715/230
2012/0183185 A1 * 7/2012 Grigsby ............ G06F 17/30256
  382/128
2012/0246029 A1 * 9/2012 Ventrone ................ G06Q 30/06
  705/26.63
2015/0046483 A1 * 2/2015 Liu .................. G06F 17/30247
  707/758
2016/0154823 A1 * 6/2016 Bhagwan .......... G06F 17/30389
  382/110

OTHER PUBLICATIONS

Written Opinion received for PCT Application No. PCT/US2017/045948, dated Oct. 25, 2017, 4 pages.

* cited by examiner

DETERMINING AN ITEM THAT HAS CONFIRMED CHARACTERISTICS

RELATED APPLICATIONS

This application claims the priority benefit of U.S. Provisional Application No. 62/375,855, entitled "DETERMINING AN ITEM THAT HAS CONFIRMED CHARACTERISTICS," filed Aug. 16, 2016, which is hereby incorporated herein by reference in its entirety.

TECHNICAL FIELD

Embodiments of the present disclosure generally relates to the technical field of special-purpose machines that facilitate interaction with image search systems including computerized variants of such special-purpose machines and improvements to such variants, and to the technologies by which such special-purpose machines become improved compared to other special-purpose machines that facilitate interactions with the image search systems. Specifically, the present disclosure addresses systems and methods to determine an item that has confirmed characteristics.

BACKGROUND

Conventionally, a user may search for an item from an item inventory using a textual search query that describes the item. However, the user's description of the item can often be inaccurate or incomplete when comparing the user's search query with a seller's description of the same item. Moreover, items from the item inventory can be subject to multiple interpretations and thus various descriptions may be used to describe the same item. For example, an item from the item inventory may be a described by more than one seller in more than one way. Accordingly, conventional textual searches of items may place an increased burden on the user.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows describes systems, methods, techniques, instruction sequences, and computing machine program products that illustrate example embodiments of the present subject matter. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a computer vision system is configured to receive an image of an object from a client device. After the image of the object is received, the computer vision system determines a set of characteristics that is predicted to match with the object. The set of characteristics correspond to characteristics of items that are published as item listings and indicated in an item inventory. The set of characteristics are displayed on the client device in order to confirm whether the predicted characteristics match with the object depicted in the image. Once confirmation of at least one characteristic from the set of characteristics is received, the computer vision system causes display of a result item that has the confirmed at least one characteristic.

In further example embodiments, a knowledge graph is utilized by the computer vision system to determine characteristics that are predicted to match with the object. Further, the knowledge graph includes nodes that represent characteristics of the items that are published as item listings and indicated in the item inventory.

Accordingly, one or more of the methodologies discussed herein may obviate a need for performing a search using a textual search query, which may have the technical effect of reducing computing resources used by one or more devices within the system. Examples of such computing resources include, without limitation, processor cycles, network traffic, memory usage, storage space, and power consumption.

Figure 1:
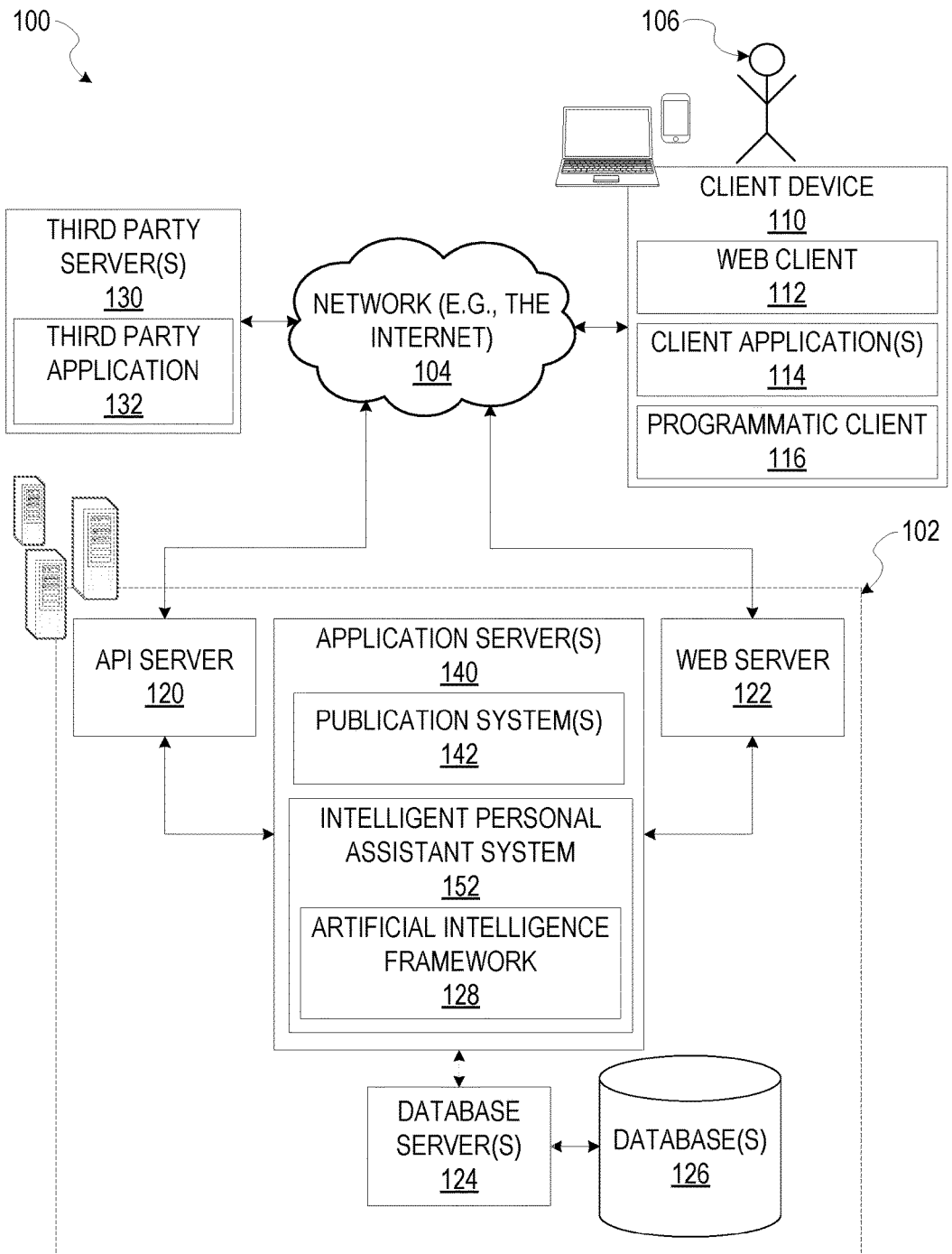
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication system, provides server-side functionality via a network 104 (e.g., the Internet or wide area network (WAN)) to one or more client devices 110. FIG. 1 illustrates, for example, a web client 112, a client application 114, and a programmatic client 116 executing on client device 110.

The client device 110 may comprise, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 includes components that are used to display information (e.g., in the form of user interfaces). In further embodiments, the client device 110 may comprise one or more of touch screens, accelerometers, gyroscopes, cameras, microphones, global positioning system (GPS) devices, and so forth. In one embodiment, the networked system 102 is a network-based publication system that responds to requests for item listings, publishes publications comprising item listings of items available on the network-based publication system, and manages searches for the published item listings. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, an e-commerce site application, an intelligent personal assistant application and the like. In some embodiments, if the intelligent personal assistant application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user).

A user 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 host the publication system 142, and the intelligent personal assistant system 152, each of which may comprise one or more modules, engines, or applications and each of which may be embodied as hardware, software, firmware, circuitry, or any combination thereof. The application servers 140 are, in turn, shown to be coupled to one or more database servers 124 that facilitate access to one or more information storage repositories or database(s) 126. In an example embodiment, the databases 126 are storage devices that store information communicated (e.g., publications or listings) to any of the publication system 142 or the intelligent personal assistant system 152. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, or publication functions that are supported by the relevant applications of the networked system 102.

The publication systems 142 provide a number of publication functions and services to users 106 that access the networked system 102. While the publication system 142 is shown in FIG. 1 to both form part of the networked system 102, it will be appreciated that, in alternative embodiments, the system 142 may form part of a service that is separate and distinct from the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The web client 112 accesses the publication system 142 or the intelligent personal assistant system 152 via the web interface supported by the web server 122. Similarly, the programmatic client 116 accesses the various services and functions provided by the publication system 142 or the intelligent personal assistant system 152 via the programmatic interface provided by the API server 120.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 4-6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
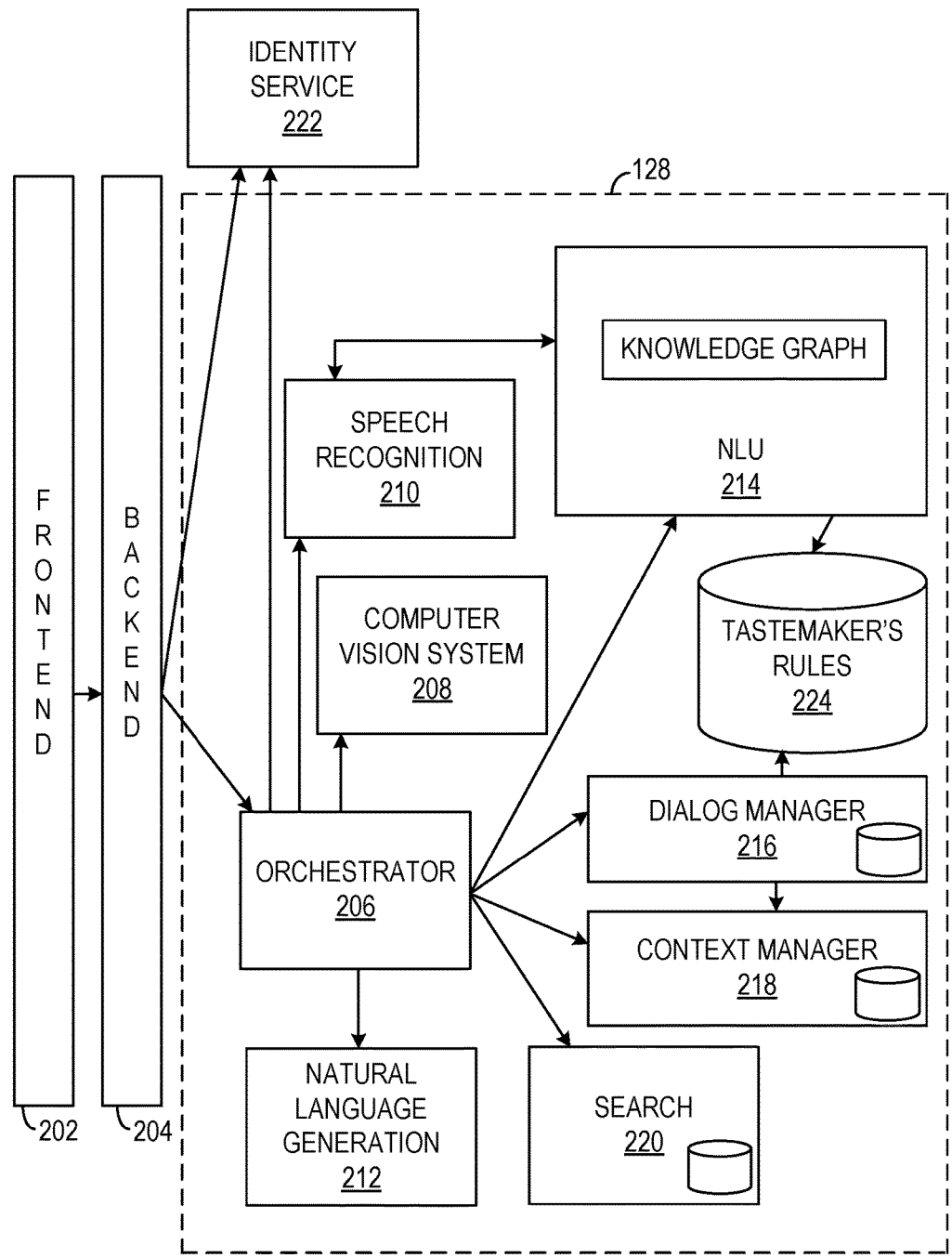
FIG. 2 is a block diagram showing the architectural details of an intelligent personal assistant system, according to some example embodiments.

FIG. 2 is a block diagram showing the architectural details of an intelligent personal assistant system 152, according to some example embodiments. Specifically, the intelligent personal assistant system 152 is shown to include a front end component 202 (FE) by which the intelligent personal assistant system 152 communicates (e.g., over the network 104) with other systems within the network architecture 100. The front end component 202 can communicate with the fabric of existing messaging systems. As used herein, the term messaging fabric refers to a collection of APIs and services that can power third party platforms such as Facebook messenger, Microsoft Cortana and other "bots". In one example, a messaging fabric can support an online commerce ecosystem that allows users to interact with commercial intent. Output of the front end component 202 can be rendered in a display of a client device, such as the client device 110 in FIG. 1 as part of an interface with an intelligent personal assistant (e.g., "bot").

The front end component 202 of the intelligent personal assistant system 152 is coupled to a back end component 204 for the front end (BFF) that operates to link the front end component 202 with an artificial intelligence framework 128. The artificial intelligence framework 128 includes several components discussed below.

In one example of an intelligent personal assistant system 152, an AI orchestrator 206 orchestrates communication of components inside and outside the artificial intelligence framework 128. Input modalities for the AI orchestrator 206 are derived from a computer vision component 208 (e.g., computer vision system), a speech recognition component 210, and a text normalization component which may form part of the speech recognition component 210. The computer vision component 208 (e.g., computer vision system) can identify objects and attributes from visual input (e.g. photo). The speech recognition component 210 converts audio signals (e.g. spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 128 further includes a natural language understanding or NLU component 214 that operates to parse and extract user intent and intent parameters (for example mandatory and/or optional parameters). Although not shown in FIG. 2, the NLU component 214 may also include sub-components such as a spelling corrector (speller), a parser, a Named Entity Recognition (NER) sub-component, and a Word Sense Detector (WSD). The NLU component 214 may also include a knowledge graph, as shown in FIG. 2.

The artificial intelligence framework 128 further includes a dialog manager 216 that operates to understand a "completeness of specificity" (for example of an input, such as a search query or utterance) and decide on a next action type and a parameter (e.g. "search" or "request further information from user"). In one example, the dialog manager 216 operates in association with a context manager 218 and an NLG component 212 (or Natural Language Generation component). The context manager 218 manages the context and communication of a user with respect to the intelligent personal assistant (e.g., "bot") and the artificial intelligence associated with the intelligent personal assistant. The context manager 218 comprises two parts: long term history and short term memory. Data entries into one or both of these parts can include the relevant intent and all parameters and all related results of a given input, bot interaction, or turn of communication, for example. The NLG component 212 operates to compose a natural language utterance out of an AI message to present to a user interacting with the intelligent bot.

A search component 220 is also included within the artificial intelligence framework 128. Although not shown, the search component 220 has front-end and back end units. The back end unit operates to manage item and product inventory and provide functions of searching against the inventory, optimizing towards a specific tuple of intent and intent parameters. An identity service 222 component, that may or may not form part of artificial intelligence framework 128, operates to manage user profiles, for example explicit information in the form of user attributes, e.g. "name", "age", "gender", "geolocation", but also implicit information in forms such as "information distillates" such as "user interest", or "similar persona", and so forth.

The functionalities of the artificial intelligence framework 128 can be set into multiple parts, for example a decision execution and context parts. In one example, the decision execution part includes operations by the AI orchestrator 206, the NLU component 214 and its subcomponents, the dialog manager 216, the NLG component 212, the computer vision component 208 and speech recognition component 210. The context part of the AI functionality relates to the parameters (implicit and explicit) around a user and the communicated intent (for example, towards a given inventory, or otherwise). In order to measure and improve AI quality over time, the artificial intelligence framework 128 is trained using sample queries (e.g. a dev set) and tested on a different set of queries (e.g. an eval set), both sets to be developed by human curation. Also, the artificial intelligence framework 128 is to be trained on transaction and interaction flows defined by experienced curation specialists, or human override 224. The flows and the logic encoded within the various components of the artificial intelligence framework 128 define what follow-up utterance or presentation (e.g. question, result set) is made by the intelligent assistant based on an identified user intent.

Reference is made further above to example input modalities of the intelligent online personal assistant (e.g., "bot") in an intelligent personal assistant system 152. The intelligent personal assistant system 152 seeks to understand a user's intent (e.g. targeted search, compare, shop/browse, and so forth) and any mandatory parameters (e.g. product, product category, item, and so forth) and/or optional parameters (e.g. explicit information, e.g. aspects of item/product, occasion, and so forth) as well as implicit information (e.g. geolocation, personal preferences, age and gender, and so forth) and respond to the user with a well thought out or "intelligent" response. Explicit input modalities can include text, speech, and visual input and can be enriched with implicit knowledge of user (e.g. geolocation, previous browse history, and so forth). Output modalities can include text (such as speech, or natural language sentences, or product-relevant information, and images on the screen of a smart device e.g. client device 110. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. The user may not know what an item is called, or it may be hard or even impossible to use text for fine detailed information that only an expert may know, for example a complicated pattern in apparel or a certain style in furniture. Moreover, it is inconvenient to type complex text queries on mobile phones and long text queries typically have poor recall. Thus, with reference to FIG. 2, key functionalities of the computer vision component 208 include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

Figure 3:
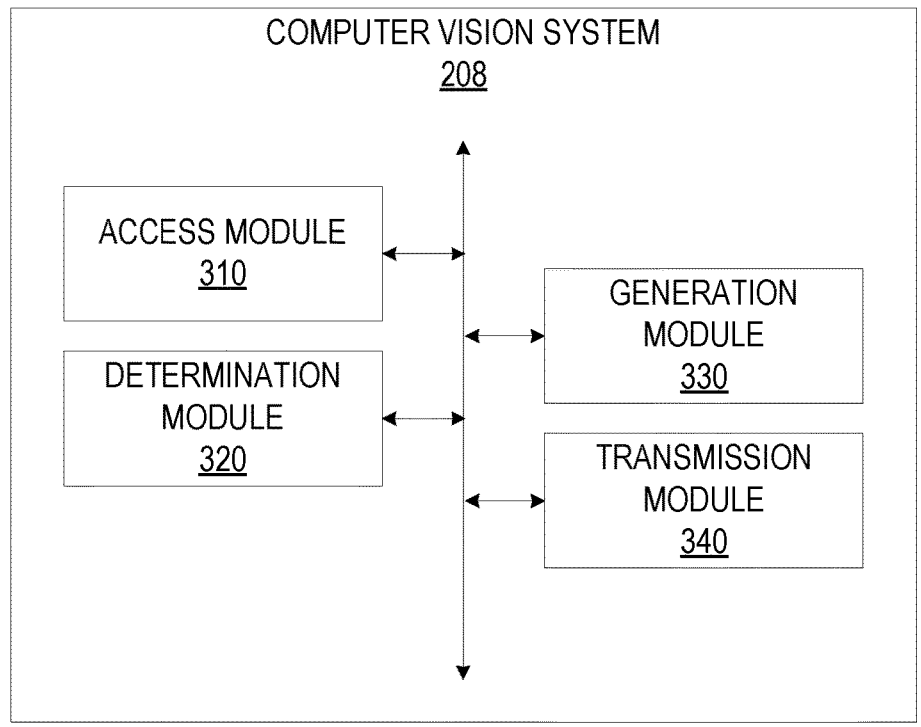
FIG. 3 is a block diagram illustrating components of a computer vision system, according to some example embodiments.

FIG. 3 is a block diagram illustrating components of a computer vision system 208, according to some example embodiments. The computer vision system 208 is shown as including an access module 310, a determination module 320, a generation module 330, and a transmission module 340, all configured to communicate with each other (e.g., via a bus, shared memory, or a switch). Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the access module 310 is configured to receive an image that depicts an object. The image is received by the access module 310 from a client device (e.g., client device 110). Moreover, in some instances, a user of the client device is searching for information about the object depicted in the image. In some embodiments, the image of the object is generated by the client device. For example, the image of the object is captured using a camera that is attached to the client device.

In various example embodiments, the access module 310 is configured to retrieve structured data that corresponds to characteristics of one or more items that are published as item listings. In other words, the structured data indicates the characteristics of the one or more items. The structure data is stored, in some instances, in a database (e.g., database 126) that is maintained by the computer vision system 208. In some embodiments, the published item listings are listings for items that are available for sale. The published item listings are published, in some instances, by the publication system 142.

In various example embodiments, structured data includes tables are stored in a database maintained by the publication system. Further, each of the characteristics of the one or more items are indicated by the tables. For example, each of the characteristics corresponds to a cell within a database table. In other words, the characteristics are each stored in a specific cell within the database table. Moreover, the database table may be stored within a database (e.g., database 126) maintained by the intelligent personal assistant system 152.

The one or more characteristics may indicate broad features (e.g., coarse grain characteristics) of higher granularity. The one or more characteristics, in some instances, may also indicate more specific features (e.g., fine grain characteristics). The broad features pertain to groups of items whereas the specific features pertain to individual items. Examples of broad features include categories of items such as fashion, outdoor, gaming, and the like. Broad features may also describe a function that is served by a group of items. Broad features may also include a manufacturer or a brand that is associated with a group of items. Examples of specific features include characteristics that are more specific to the individual items as opposed to a group of items. For example, the specific features may indicate color, size, texture, and the like.

In further embodiments, each of the characteristics can be stored in various other forms of structured data objects. In some embodiments, the characteristics correspond to nodes within a knowledge graph. Moreover, in some instances, the knowledge graph is used to depict how the course grain characteristics relate to the fine grain characteristics. In other words, the knowledge graph depicts a relationship between a coarse grain characteristic and at least one fine grain characteristic. For example, a node corresponding to a fashion characteristic (e.g., coarse grain characteristic) may be connected to characteristics of items that fall under the fashion category (e.g., fine grain characteristics). As another example, a sports characteristic node may be connected to characteristics of sneakers, shoes, sport apparel and the like (e.g., items that can be labeled as sports items).

In various example embodiments, the determination module 320 is configured to determine a set of characteristics that is predicted to match with the object. The determination module 320 is further configured to analyze the structured data and the image that depicts the object.

In some instances, the determination module 320 is generates an image signature that corresponds to the image. The image signature includes a collection of symbols that uniquely identify the image. For example, the image signature may comprise one or more alphanumeric characters. Moreover, the alphanumeric characters may be represented as a vector. In some instances, the image signature is generated based on various features of the image (e.g., brightness, contrast, color, and the like). As a result, the image signature is a combined representation of the various features of the image. Moreover, the image signature is used during the analysis of the image.

In various example embodiments, the generation module 330 is configured to generate an interface that includes a request for confirmation of the set of characteristics. In various example embodiments, the generation module 330 generates a depiction (e.g., image or description) of each characteristics from the set of characteristics. The generation module 330 further generates an option (e.g., button) to confirm that the set of characteristics match with the object depicted in the image. In some instances, the generation module 330 generates the option to confirm the set of characteristics alongside the set of characteristics in the interface.

In various example embodiments, the transmission module 340 causes display of the generated interface on the client device. In other words, the transmission module 340 transmits data that results in a display of the generated interface on the client device. This includes transmitting data that results in display of the option to confirm that the set of characteristics match with the object. In further example embodiments, the transmission module 340 causes display of a result item that has the confirmed characteristic that matches with the object.

In various example embodiments, the access module 310 receives a confirmation from the client device that at least one characteristic from the set of characteristics match with the object depicted in the image. The confirmation, in some instances, is received upon selection of the option generated by the generation module 330. Once the confirmation is received at the access module 310, in some instances, the generation module 330 generates a further interface that includes a further request for confirmation of further characteristics. In some instances, the further characteristics are determined using the knowledge graph.

In various example embodiments, the generation module 330 is further configured to generate an edited version of the image that includes localization of the object depicted in the image received from the client device. In various example embodiments, the generation module 330 is configured to remove extraneous information from the image. The extraneous information depicts details that do not pertain to the object (e.g., a portion of the image that does not depict the object). In various example embodiments, the generation module 330 is configured to modify a brightness of the image such that visibility of the object in the image is increased. In some embodiments, the generation module 330 is configured to increase the brightness of the object in the image. Further, the generation module 330 is configured to decrease the brightness of portions of the image that do not include the object. Each of these edits may modify or further change the image signature.

Figure 4:
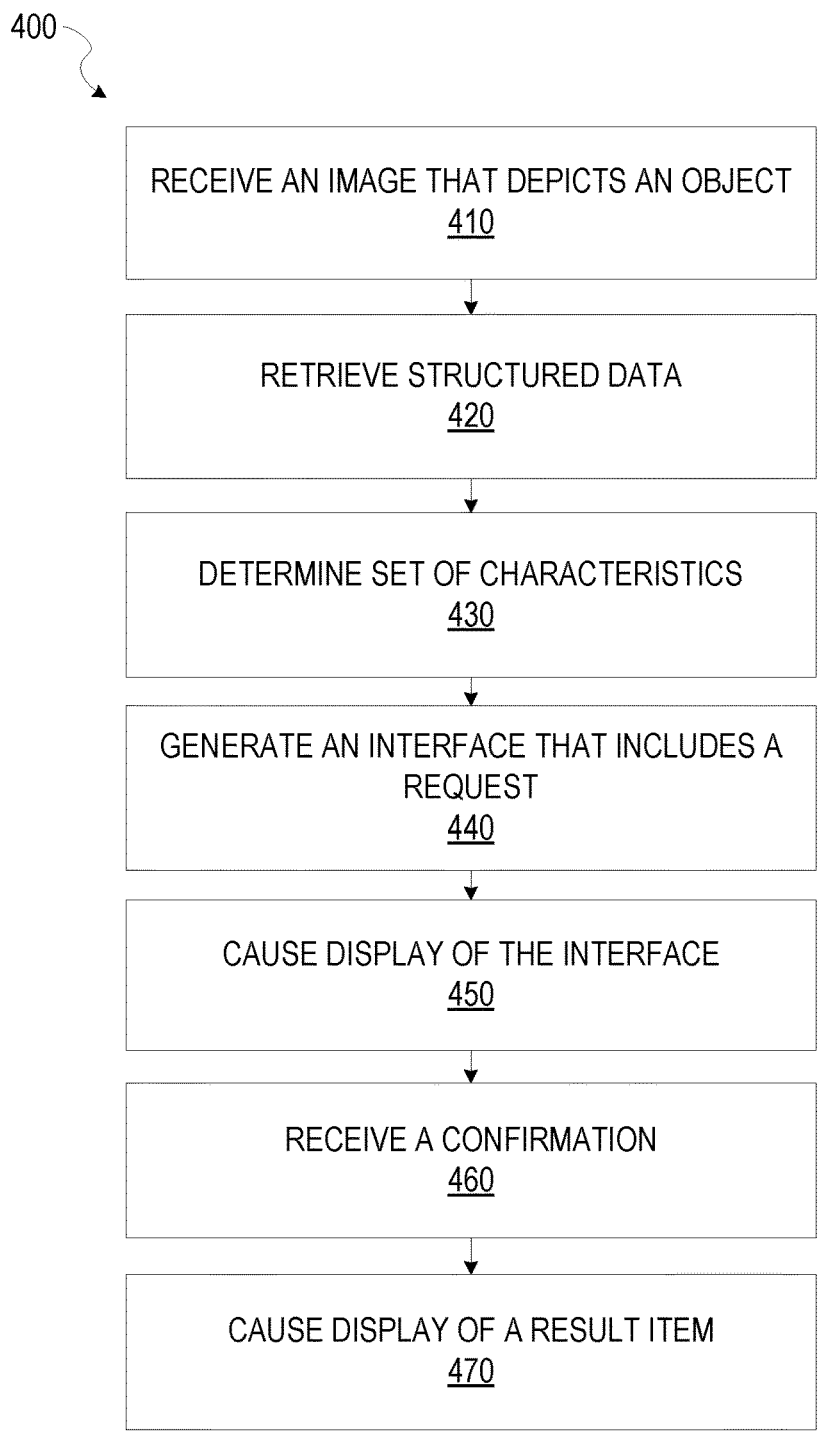
FIG. 4-6 are flowcharts illustrating operations of the computer vision system in performing a method of causing display of an item, according to some example embodiments.
Figure 5:
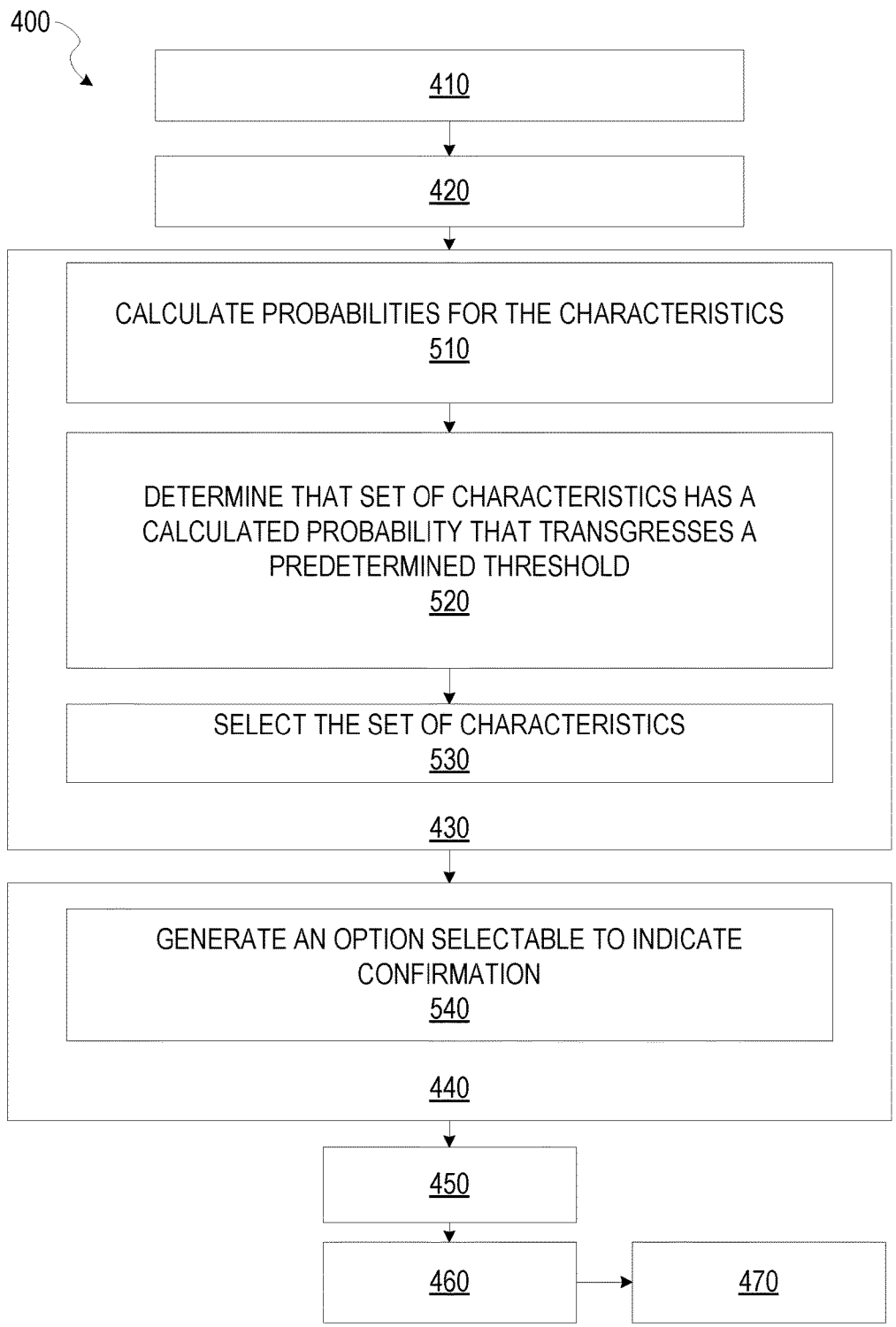
Figure 6:
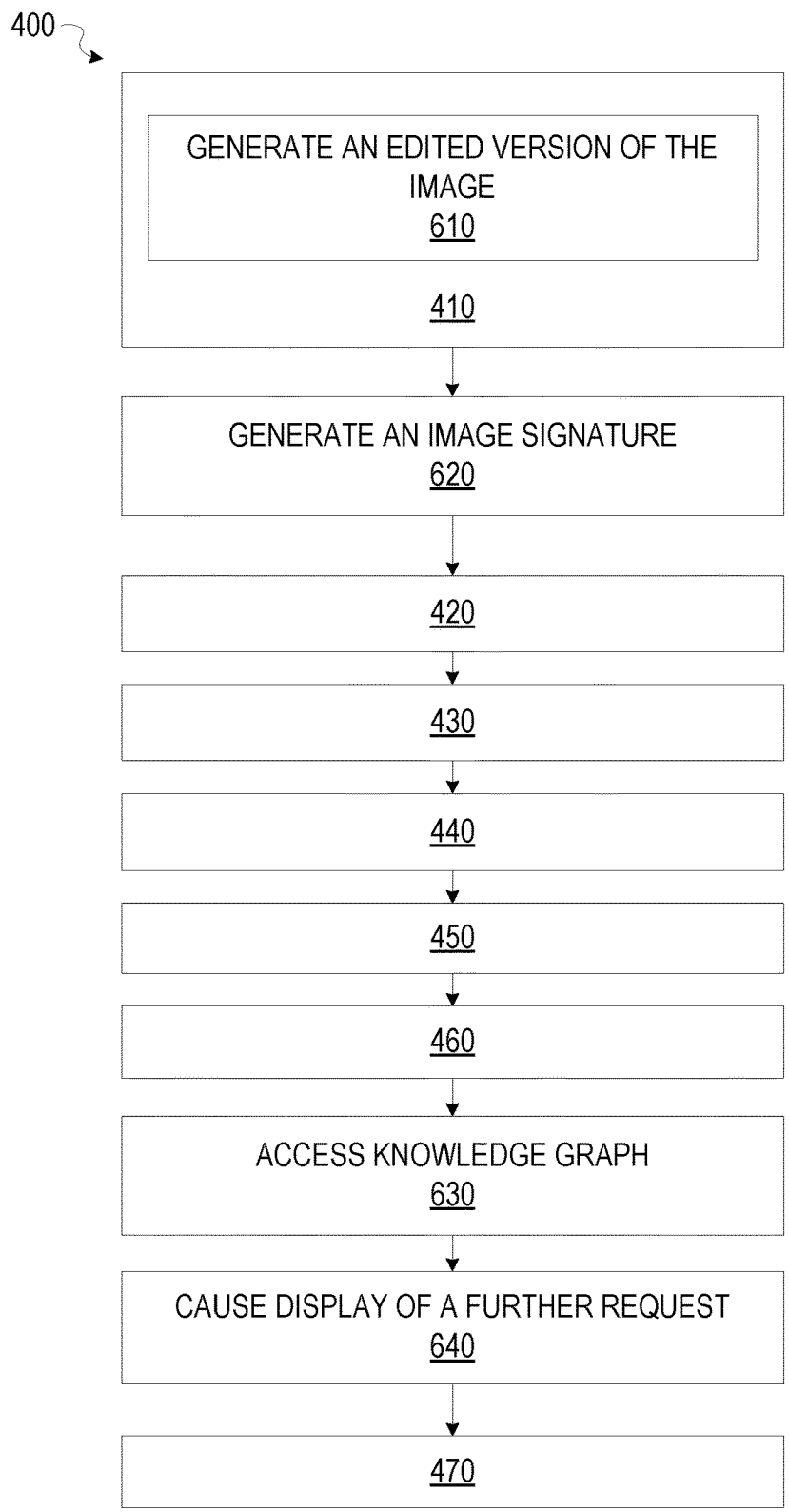

FIG. 4-6 are flowcharts illustrating operations of the computer vision system 208 in performing a method 400 of causing display of an item, according to some example embodiments. Operations in the method 400 may be performed in part or in whole by components of the computer vision system 208, which can be embodied either in whole or in part in one or more application servers 140 of a networked system 102 using components described above with respect to FIG. 3. Accordingly, the method 400 is described by way of example with reference to the computer vision system 208. However, it shall be appreciated that at least some of the operations of the method 400 may be deployed on various other hardware configurations or be performed by similar components residing elsewhere in the network architecture 100. Therefore, the method 400 is not intended to be limited to the computer vision system 208. As shown in FIG. 4, the method 400 includes operations 410, 420, 430, 440, 450, 460, and 470.

At operation 410, the access module 310 receives an image that depicts an object. In some instances, the object is depicted as occupying a portion of the image. For instance, instead of the object occupying a majority of the image, the object appears in only a particular region (e.g., a corner, a middle, a side) of the image. In various example embodiments, the image is received from a client device. Moreover, the image may be generated by the client device such as operation of a camera attached to the client device.

At operation 420, the access module 310 retrieves structured data that corresponds to characteristics of one or more items that are published as item listings. In other words, the structured data indicates the characteristics of the one or more items. The structured data may be stored in a database (e.g., database 126). Moreover, the structure data may take on a variety of forms. For example, the structured data includes database tables, knowledge graphs, and the like. Further, each of the characteristics is stored within the structured data. For example, the characteristics are stored as cells within a database table. Alternatively, the characteristics are stored as nodes within a knowledge graph.

At operation 430, the determination module 320 determines a set of characteristics that is predicted to match with the object. In various example embodiments, the determination module 320 analyzes the structured data. Further, the set of characteristics are determined by the determination module 320 based on the analysis of the structured data, as further explained below.

At operation 440, the generation module 330 generates an interface that includes a request for confirmation of the set of characteristics. In some instances, the generation module 330 generates a depiction of each characteristic from the set of characteristics. For example, the generation module 330 generates a description of each characteristic from the set of characteristics. Likewise, the generation module 330 may generate an image of each characteristic from the set of characteristics. In some instances, the descriptions and the images are found in the structured data. In other words, the structure data includes descriptions of item characteristics and images of item characteristics. Once the depiction of the set of characteristics is generated, the generation module 330 inserts the depiction of each characteristic in the generated interface.

At operation 450, the transmission module 340 causes display of the interface on the client device. The transmission module 340 transmits data that causes display of the interface. The data is transmitted over a network (e.g., network 104) to a client device (e.g., client device 110).

At operation 460, the access module 310 receives a confirmation from the client device that at least one characteristic from the set of characteristics matches with the object depicted in the image. The confirmation, in some instances, is received in response to selection of the option that is generated in the user interface.

At operation 470, the transmission module 340 causes display of a result item that has the at least one confirmed characteristic that matches with the object. In other words, the result item features the at least one confirmed characteristic as one of its traits. In some instances, the result item is included in an item inventory that is stored in a database (e.g., database 126). As a result, the result item is retrieved from the item inventory. Moreover, the transmission module 340 causes display of an image of the result item. In further embodiments, the transmission module 340 causes display of a description of the result item. The image and the description of the result item may be found in the item inventory. The item inventory, in some instances, is a repository that stores a description and an image of each item that is published by the publication system 142 (e.g., in an item listing).

In further embodiments, the intelligent personal assistant system 152 uses the at least one confirmed characteristic as a search term to search the item inventory for the result item. The items in the item inventory (e.g., the published item listings) may be tagged based on their characteristics. Also, as explained earlier, the characteristics of the items in the item inventory (e.g., the published item listings) are stored as structured data. Accordingly, items with characteristics that match with the confirmed characteristic are searchable using the characteristics.

As shown in FIG. 5, the method 400 may include one or more of operations 510, 520, 530, and 540. One or more of operations 510-530 may be performed as part (e.g., a subroutine, or a portion) of operation 430. The operation 540 may be performed as part of the operation 440.

At operation 510, the determination module 320 calculates probabilities for the characteristics of the one or more item listings. The probabilities represent or indicate likelihoods that the characteristics match with the object depicted in the image. As an example, the probabilities can be values that indicate how closely each characteristic matches with the object depicted in the image. The determination module 320, in some instances, calculates the probabilities using the image signature. As stated above, the image signature includes a collection of symbols or characteristics that uniquely identify the image.

At operation 520, the determination module 320 determines that the set of characteristics has calculated probabilities that each transgresses a predetermined threshold. The threshold, in some instances, indicates a minimum probability in order for a characteristic to be selected in the set of characteristics at operation 530. The determination module 320, in some instances, further determines that characteristics outside of the set of characteristics have calculated probabilities that do not transgress the predetermined threshold.

At operation 530, the determination module 320 selects the set of characteristics based on the determination performed at the operation 520. In other words, the determination module 320 selects the set of characteristics based on the determining that the set of characteristics has calculated probabilities that each transgresses a predetermined threshold.

At operation 540, the generation module 330 generates a graphical element of an option selectable to indicate confirmation of at least one characteristic from the set of characteristics. As stated previously, the generated option includes a button that is selectable by the user to indicate confirmation of the at least one characteristic. Moreover, the button is displayed as part of the user interface displayed on the client device. In some instances, the generation module 330 generates an option for each characteristic from the set of characteristics.

As shown in FIG. 6, the method 400 may include one or more of operations 610, 620, 630, and 640. Moreover, the operation 610 may be performed as part (e.g., a subroutine, or a portion) of the operation 410. The operation 620 may be performed after the operation 410 and prior to the operation 420. Lastly, the operations 630 and 640 may be after the operation 460 but prior to the operation 470.

At operation 610, the generation module 330 generates an edited version of the image. In various example embodiments, generating the edited version of the image includes localizing a portion of the image At operation 620, the generation module 330 generates an image signature. The image signature includes a collection of symbols that uniquely identify the image. As stated previously, the image signature may comprise one or more alphanumeric characters. Further, the collection of symbols (e.g., alphanumeric characters) may be represented as a vector. In some instances, the image signature is generated based on various features of the image (e.g., brightness, contrast, color, and the like). Accordingly, the generation module 330 analyzes the various features of the image in order to generate the image signature.

At operation 630, access module 310 accesses a knowledge graph that depicts a relationship between a coarse grain characteristic and at least one fine grain characteristic. The knowledge graph may also depict a relationship between one of the characteristics confirmed by the user at the operation 460 and a further characteristic. Accordingly, one of the characteristics confirmed by the user at the operation 460 may be a coarse grain characteristic or a fine grain characteristic depicted in the knowledge graph.

At operation 640, the transmission module 340 causes display of a further request. In various example embodiments, the further request includes information that is accessed from the knowledge graph. For example, the confirmed characteristic may correspond to a specific node (e.g., source node) in the knowledge graph. Accordingly, nodes connected to the source node may be displayed in the further request in order to further refine the search for the result item.

Figure 7:
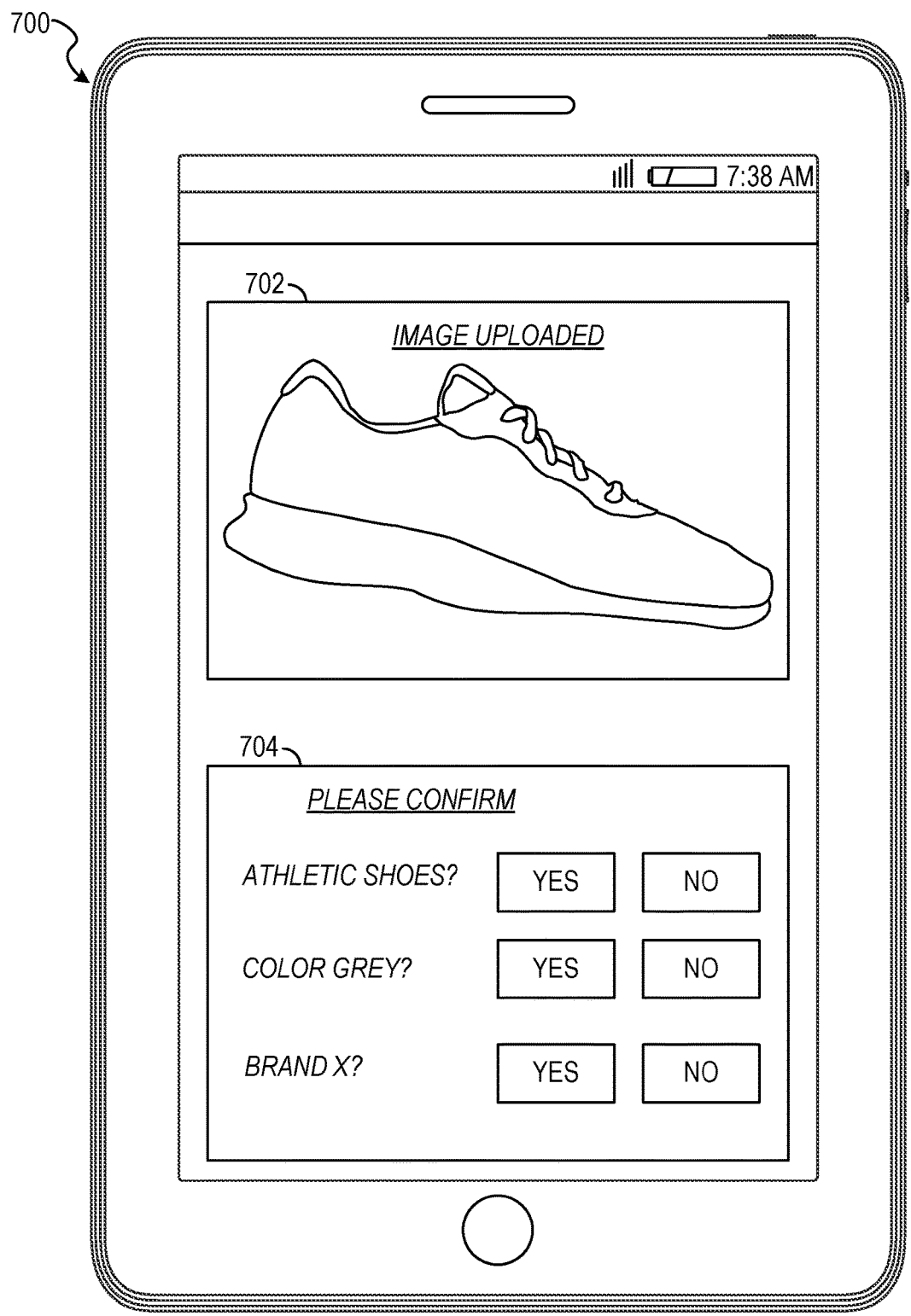
FIG. 7-9 are block diagrams that depict an example user interface, according to some example embodiments.

FIG. 7 is a block diagram that depicts an example user interface 700, according to some example embodiments. In various embodiments, the user interface 700 is displayed on a client device. As shown in FIG. 7, the example user interface 700 includes an image 702 and a section 704 that depicts a set of predicted characteristics. As also shown in FIG. 7, the image 702 depicts an object. The set of characteristics are characteristics that are predicted by the computer vision system 208 to match with the object depicted in the image 702. Further, the set of characteristics may correspond to the set of characteristics determined at the operation 430 of FIG. 4. Also shown in the section 704 are buttons that each is selectable to indicate whether a predicted characteristic matches with the object depicted in the image.

Figure 8:
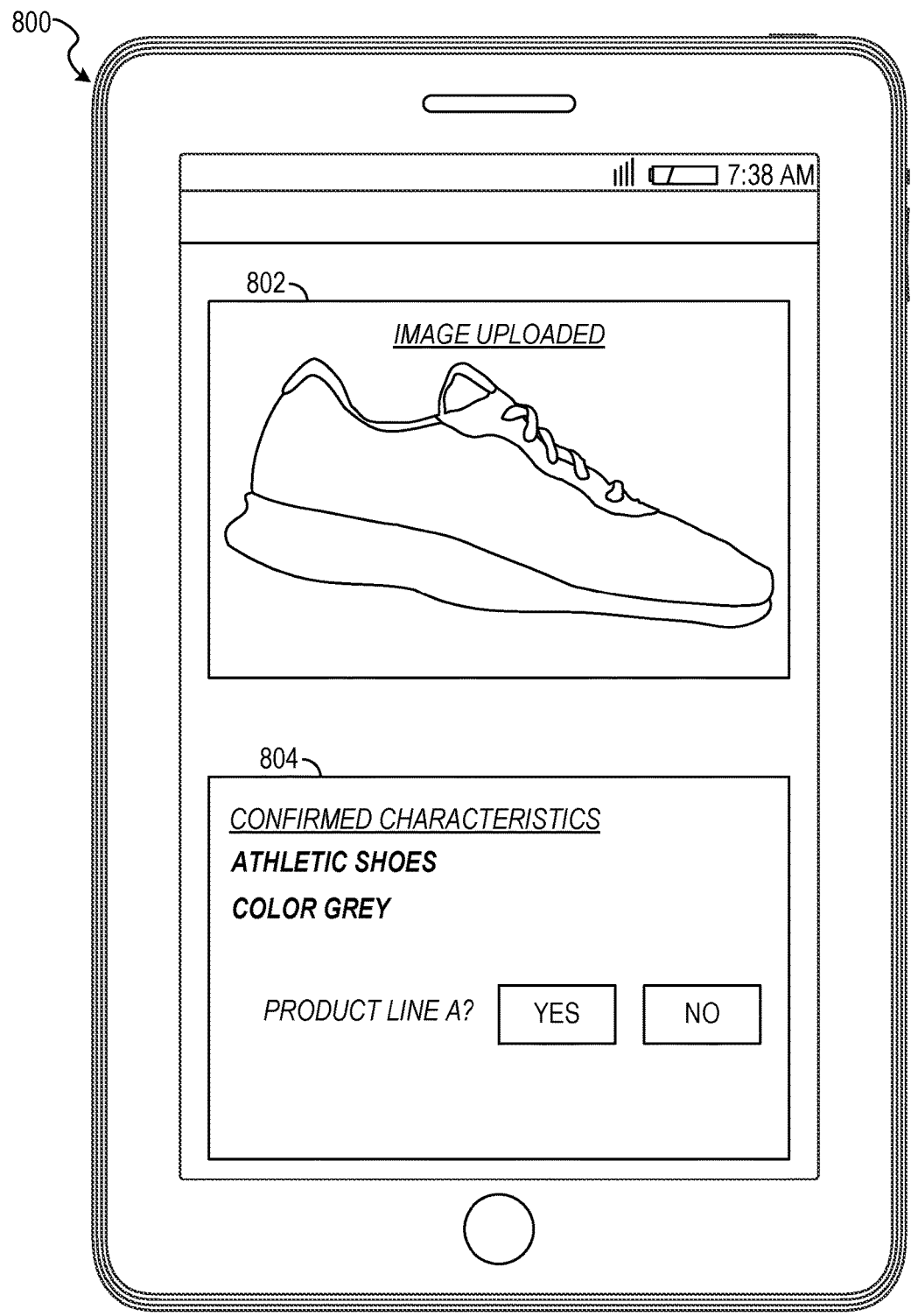

FIG. 8 is a block diagram that depicts an example user interface 800, according to some example embodiments. In various embodiments, the user interface 800 is displayed on a client device. As shown in FIG. 8, the example user interface 800 includes an image 802 and a section 804 that depicts a set of confirmed characteristics. The example user interface 800 is displayed in some instances after selection of at least one characteristic from the set of characteristics depicted in the example user interface 700. Further, as shown in FIG. 8, the section 804 depicts a request to confirm a further characteristics in order to narrow the search for the result item. The further characteristics, in some instances, may be determined from a knowledge graph.

Figure 9:
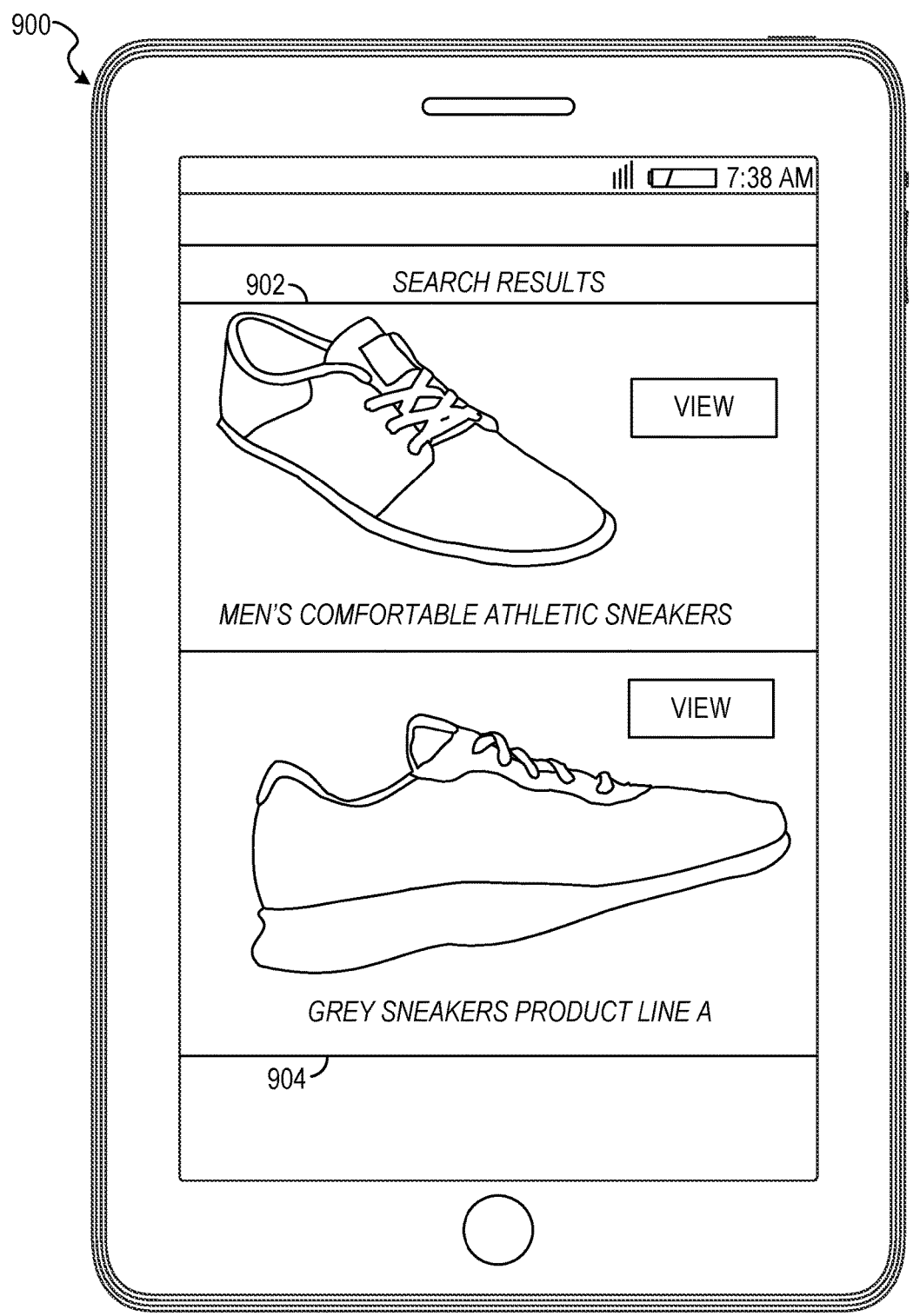

FIG. 9 is a block diagram that depicts an example user interface 900, according to some example embodiments. In various embodiments, the user interface 900 is displayed on a client device. As shown in FIG. 9, the user interface 900 depicts search results (e.g., a first search result 902, and a second search result 904). The search results are items that exhibit the confirmed characteristics that are depicted in the section 804 of FIG. 8. The search results include an image of an item and a description of the item. Also shown in FIG. 9 are buttons that can be used to browse an item listing corresponding to the search result.

Figure 10:
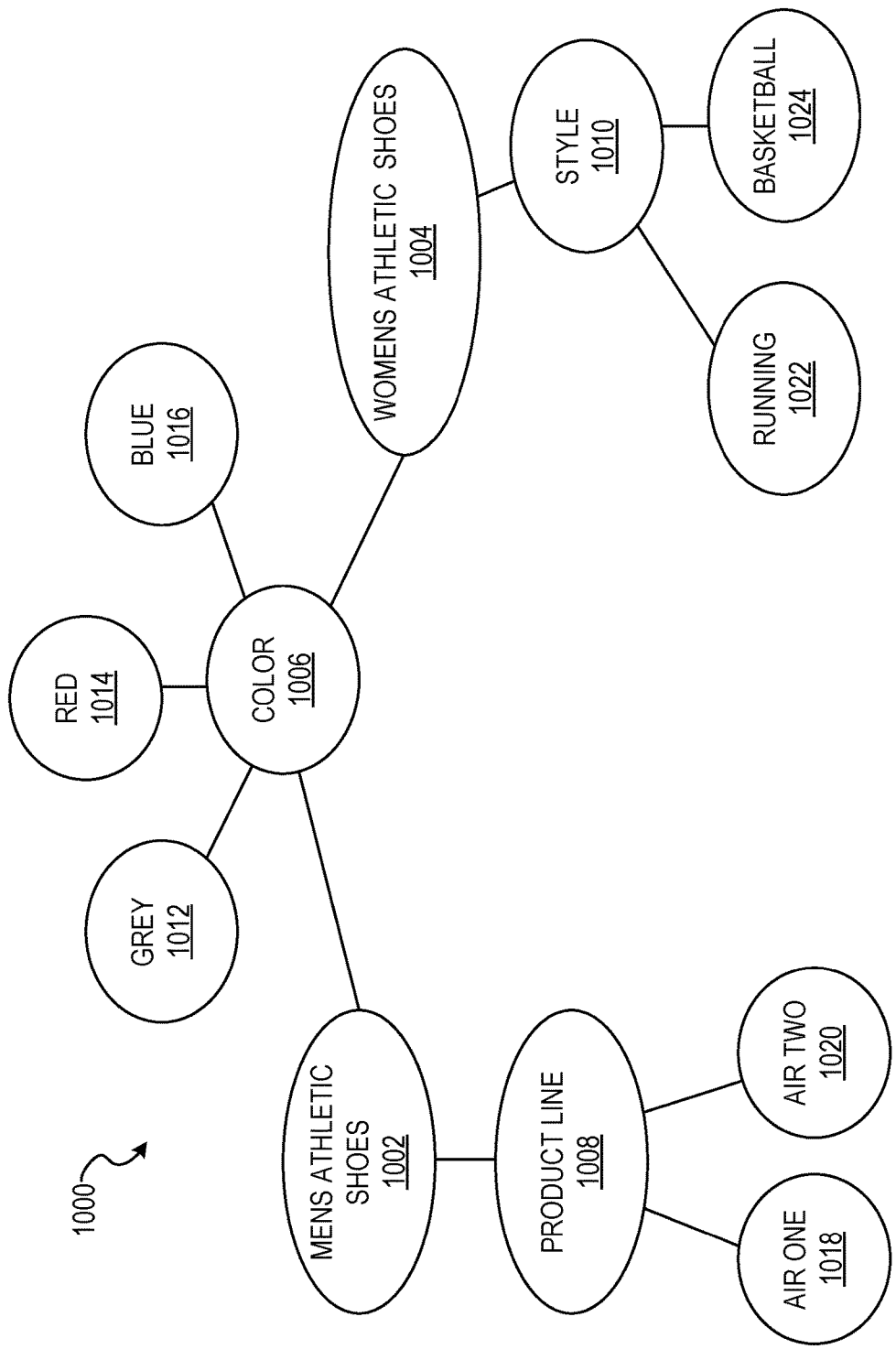
FIG. 10 is a block diagram that depicts an example knowledge graph, according to some example embodiments.

FIG. 10 is a block diagram that depicts an example knowledge graph 1000, according to some example embodiments. The knowledge graph 1000 includes node 1002, node 1004, node 1006, node 1014, and node 1016. Each of the nodes 1002, 1004, 1006, 1008, and 1010 indicate coarse grain characteristics. Further included in the knowledge graph 1000 are nodes 1012, 1014, 1016, 1018, 1020, 1022, and 1024. Each of the nodes 1012, 1014, 1016, 1018, 1020, 1022, and 1024 indicate fine grain characteristics that can be used to describe items within the item inventory.

As further shown, the knowledge graph 1000 indicates a connection between the node 1006 and each of the nodes 1012, 1014, and 1016. Moreover, the knowledge graph 1000 indicates a connection between the node 1002 and the node 1006. The knowledge graph 1000 also indicates a connection between the node 1004 and 1006. These connections in the knowledge graph 1000 indicate that the items in the item inventory with characteristics that correspond to nodes 1012, 1014, and 1016 can be further characterized according to these coarse grain characteristics (e.g., nodes 1002, node 1004, and 1006).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 11:
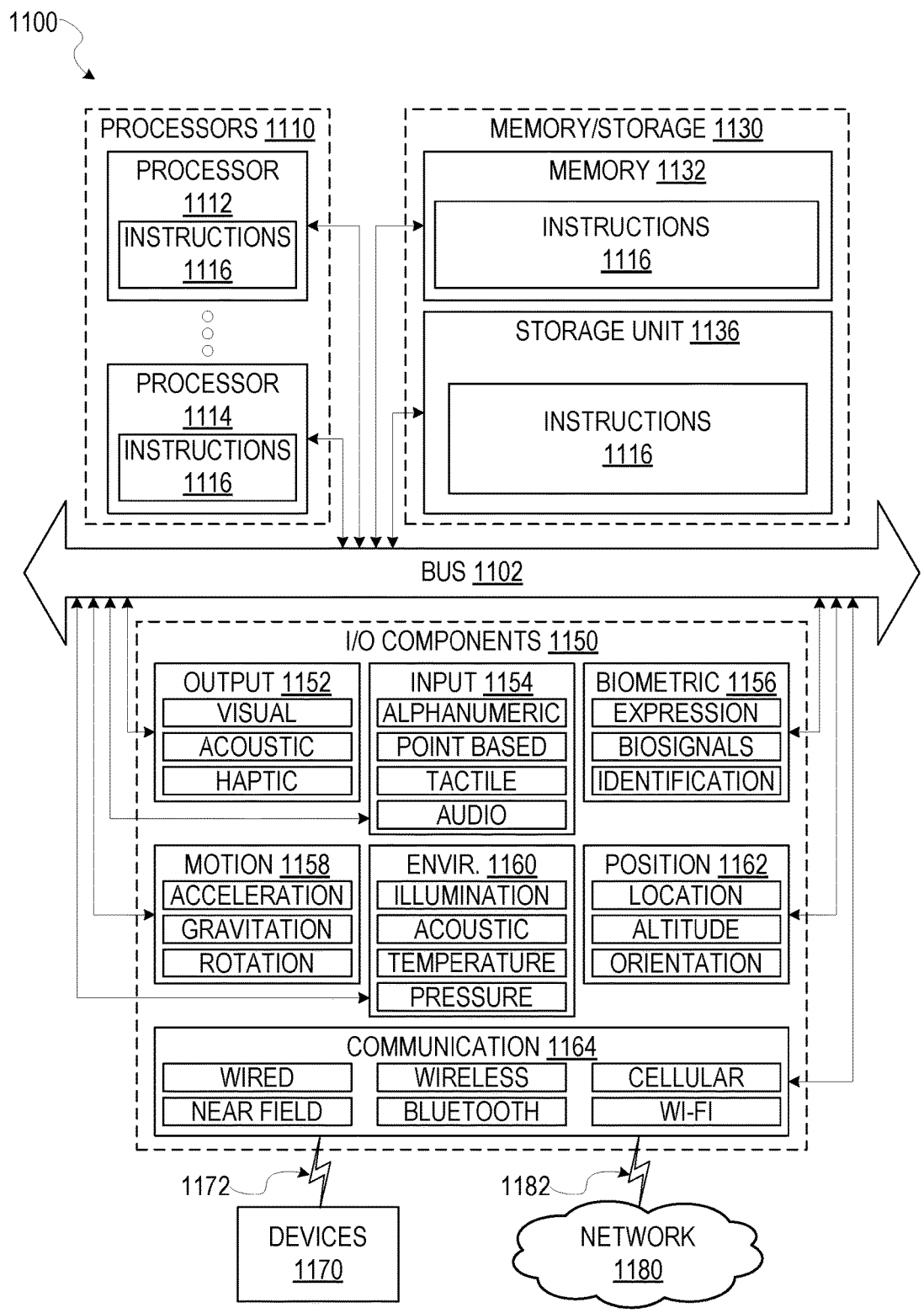
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions may cause the machine to execute the flow diagrams of FIGS. 4-6. The instructions transform the general, non-programmed machine into a particular machine specially configured to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a personal digital assistant (PDA), an entertainment media system, a cellular telephone, a smart phone, a mobile device, a wearable device (e.g., a smart watch), a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, from a client device, an image that depicts an object;
retrieving structured data that indicates item characteristics of one or more items that are published as item listings;
determining, based on analysis of the structured data and the image that depicts the object, a set of item characteristics that is predicted to match with item characteristics of the object;
generating, using one or more processors, a user interface that includes a request for confirmation of the set of item characteristics determined based on the analysis of the structured data and the image that depicts the object;
causing display of the user interface on the client device;
receiving a confirmation from the user interface on the client device that at least one item characteristic from the set of item characteristics matches with the object depicted in the image;
accessing a knowledge graph that depicts a relationship between a confirmed item characteristic and a further item characteristic; and
causing display of a further request based on the received confirmation from the client device, the further request requesting confirmation of a further item characteristic that is predicted to match with the item characteristics of the object based on the knowledge graph.

2. The method of claim 1, further comprising causing display of an item listing of a result item that has the confirmed at least one item characteristic from the set of item characteristics.

3. The method of claim 1, wherein the analysis of the structured data and the image includes:
calculating probabilities for the item characteristics of the one or more item listings, the probabilities indicating likelihoods that the item characteristics match with the characteristics of the object;
determining that the set of item characteristics has calculated probabilities that each transgresses a predetermined threshold; and
selecting the set of item characteristics based on the determining that the set of item characteristics has calculated probabilities that each transgresses a predetermined threshold.

4. The method of claim 1, wherein the request includes an image and a description of each characteristic from the set of item characteristics.

5. The method of claim 1, wherein the generating includes generating a graphical element of an option selectable to indicate the confirmation of the at least one item characteristic from the set of item characteristics.

6. The method of claim 1, further comprising:
generating an edited version of the image that includes a localization of the object depicted in the image received from the client device.

7. The method of claim 6, wherein the generating includes removing extraneous information from the image, the extraneous information depicting details of the image that do not include the object.

8. The method of claim 6, wherein the generating includes modifying a brightness of the image such that visibility of the object in the image is increased.

9. A system comprising:
one or more hardware processors; and
a memory storing executable instructions that, when executed by the one or more processors, cause the one or more processors to perform operations comprising:
receiving, from a client device, an image that depicts an object;
retrieving structured data that indicates item characteristics of one or more items that are published as item listings;
determining, based on analysis of the structured data and the image that depicts the object, a set of item characteristics that is predicted to match with item characteristics of the object;
generating an interface that includes a request for confirmation of the set of item characteristics determined based on the analysis of the structured data and the image that depicts the object;
causing display of the interface on the client device;
receiving a confirmation from the client device that at least one characteristic from the set of item characteristics matches with the object depicted in the image;
accessing a knowledge graph that depicts a relationship between a confirmed item characteristic and a further item characteristic; and
causing display of a further request based on the received confirmation from the client device, the further request requesting confirmation of a further item characteristic that is predicted to match with the item characteristics of the object based on the knowledge graph.

10. The system of claim 9, wherein the operations further comprise causing display of an item listing of a result item that has the confirmed at least one item characteristic from the set of item characteristics.

11. The system of claim 9, wherein the operations further comprise:
calculating probabilities for the item characteristics of the one or more item listings, the probabilities indicating likelihoods that the item characteristics match with the item characteristics of the object;
determining that the set of item characteristics has calculated probabilities that each transgresses a predetermined threshold; and
selecting the set of item characteristics based on the determining that the set of item characteristics has calculated probabilities that each transgresses a predetermined threshold.

12. The system of claim 9, wherein the request includes an image and a description of each characteristic from the set of item characteristics.

13. The system of claim 9, wherein the operations further comprise generating a graphical element of an option selectable to indicate the confirmation of the at least one characteristic from the set of item characteristics.

14. The system of claim 9, wherein the operations further comprise generating an edited version of the image that includes a localization of the object depicted in the image received from the client device.

15. The system of claim 14, wherein the operations further comprise removing extraneous information from the image, the extraneous information depicting details of the image that do not include the object.

16. A non-transitory machine-readable medium storing instructions that, when executed by one or more processors of a machine, cause the machine to perform operations comprising:
receiving, from a client device, an image that depicts an object;
retrieving structured data that indicates item characteristics of one or more items that are published as item listings;

determining, based on analysis of the structured data and the image that depicts the object, a set of item characteristics that is predicted to match with item characteristics of the object;

generating an interface that includes a request for confirmation of the set of item characteristics determined based on the analysis of the structured data and the image that depicts the object;

causing display of the interface on the client device;

receiving a confirmation from the client device that at least one characteristic from the set of item characteristics matches with the object depicted in the image;

accessing a knowledge graph that depicts a relationship between a confirmed item characteristic and a further item characteristic; and causing display of a further request based on the received confirmation from the client device, the further request including confirmation of a further item characteristic that is predicted to match with the item characteristics of the object based on the knowledge graph.

* * * * *